March 25, 1969   J. C. LOWE   3,434,968
METHOD AND APPARATUS FOR CLARIFYING WATER
Filed May 12, 1966   Sheet 1 of 3

INVENTOR.
JOHN C. LOWE
BY McLean & Dibble
ATTORNEY

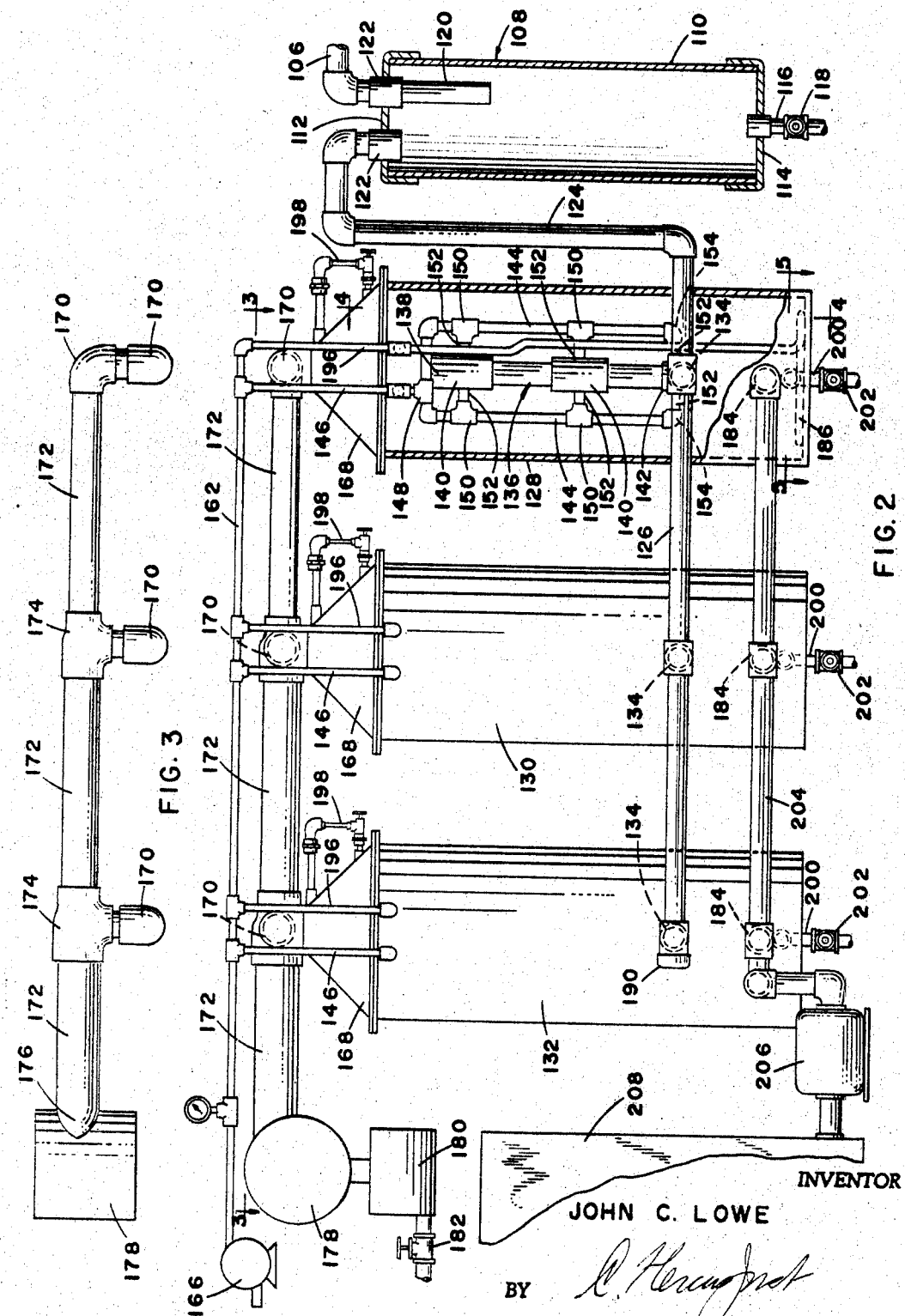

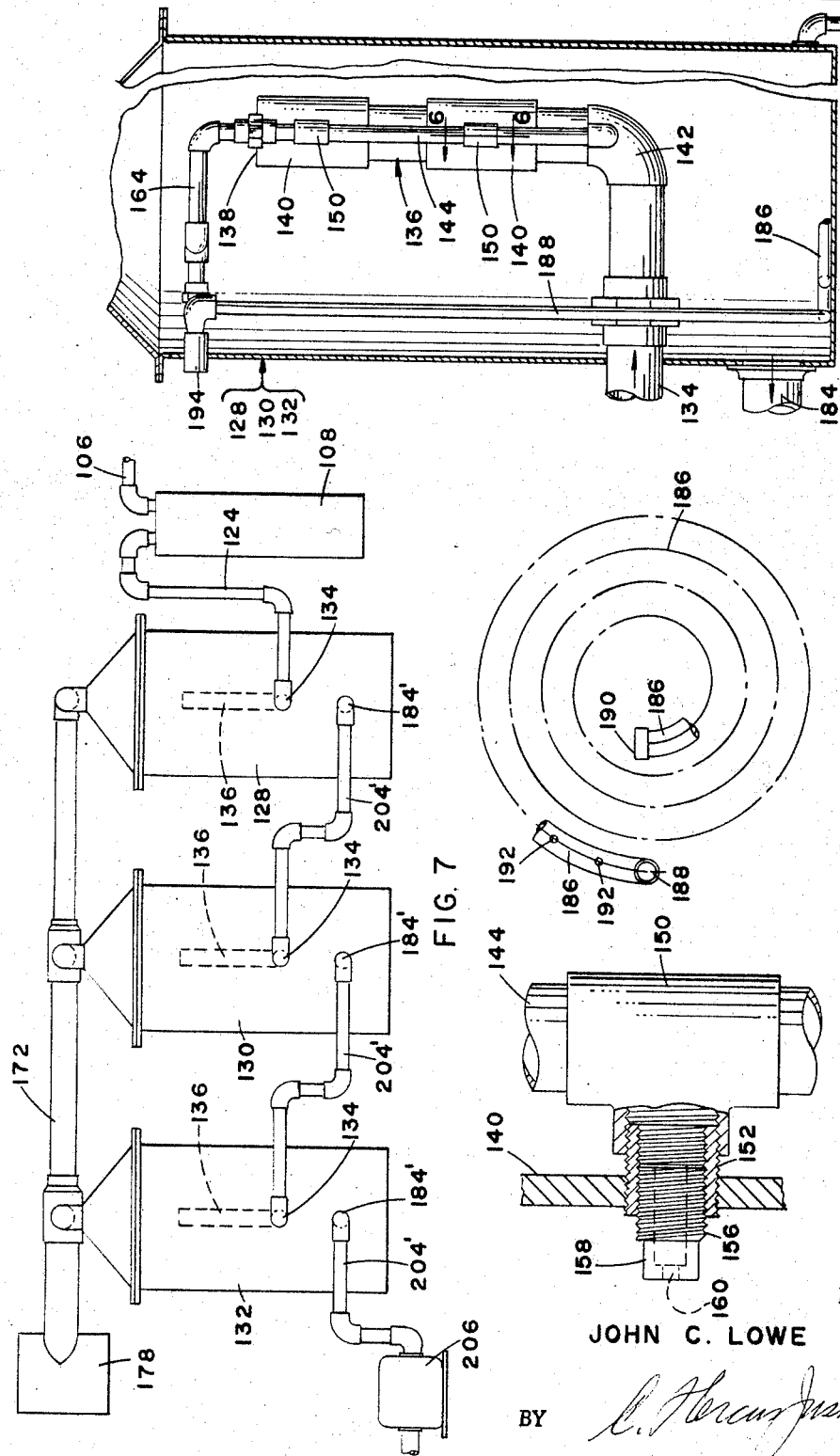

United States Patent Office 3,434,968
Patented Mar. 25, 1969

3,434,968
METHOD AND APPARATUS FOR CLARIFYING WATER
John C. Lowe, York, Pa., assignor to Broadway Research and Development Corporation, York, Pa., a corporation of Pennsylvania
Continuation-in-part of application Ser. No. 304,183, Aug. 23, 1963. This application May 12, 1966, Ser. No. 554,275
Int. Cl. C02b 1/10, 1/00
U.S. Cl. 210—44                    25 Claims

ABSTRACT OF THE DISCLOSURE

A method and apparatus for clarifying waste liquid having impurities therein capable of being converted into foam by passing feed water to be clarified along a confined path directed upwardly, injecting a plurality of streams of gas thereinto at longitudinally spaced locations at a pressure adequate to substantially saturate said water with gaseous bubbles, discharging said stream of water to atmosphere from the upper end of said confined path to permit the entrapped gas bubbles to expand and form a froth or foam on the top of a body of said liquid, applying a negative pressure above said froth or foam to withdraw the same from the top of said liquid, and collapsing said froth and bubbles after removal from said body of liquid to form a sludge thereof to facilitate removal and withdrawing the relatively clarified liquid from said body thereof.

---

This application is a continuation-in-part of application Ser. No. 304,183, filed Aug. 23, 1963, now abandoned.

This invention is a method for removing synthetic detergents or other foamable impurities from water and a novel apparatus which may be used in the process. As is well-known, the presence of large amounts of syndets—synthetic detergents—in modern waste waters is creating an increasingly difficult problem in sewage treatment, since bacterial processing ordinarily does not effect syndets and the disposal of effluents containing syndets is creating esthetic offenses in many parts of the country.

This invention also pertains to clarifying water used for industrial purposes which contaminate the same with impurities of various kinds, including those such as dyestuffs which discolor the water, whereby the water is unfit for re-use or discharge into public streams.

This invention is remarkably effective in separating water from synthetic detergent and has, as its end products, a detergent concentrate or extract which may be reused, if desired, and a water product which is substantially free of detergent, and which may be sent to waste without causing the great foaming or other problems associated with detergent wastes or which, after only simple filtration, may often be reused as industrial water. The apparatus is very simple and of rugged construction with few moving elements. The apparatus is especially useful for installation in commercial laundries which under some proposed laws may be required to pretreat their waste for detergent removal before discharge to a sewage system. The apparatus is capable of modification to a small size suitable for domestic installation or to a large size sufficient for municipal waste treatment.

The method of this invention comprises passing waste water containing detergent, or other forms of colored or colorless impurities, into contact with a stream of inert gas sufficient to foam the detergent out of the water while simultaneously applying a negative pressure (that is, less than atmospheric) above the water to encourage foaming, to prevent the weight of top layers of foam from crushing lower layers, and to carry off the foam. Preferably, after contacting the gas stream, the detergent-containing water may be held in one or more zones of relative quiescence to give enough time for the slight vacuum applied above the body of water to remove all the foam formed by the gas contact from the water. The foam is then passed through a comminuting device to break the foam bubbles and produce a concentrate of detergent in water. Preferably, the inert gas employed is air and, also, preferably, this air is injected into the waste at a multiplicity of points along the flow path to insure complete and intimate contact between the detergent-containing water and the inert gas. Also, it has been found that remarkably effective results are obtained when the gas-water contact takes place by gas injection into a plurality of points along an upflow zone of restricted cross-section, the upflow zone terminating at an orifice within the zone of relative quiescence. A sufficient number of such upflow and quiescent zones are employed to insure the desired amount of detergent removal without allowing a weight of foam to accumulate at the top of any zone which would cause undue breakage of foam bubbles within those zones. The air or other inert gas may be introduced at a plurality of vertically and horizontally spaced points along the vertical flow-path through each zone.

In removing certain types of impurities from used industrial water and especially those which have discolored the water, color-absorbing materials, such as unslaked lime, may be introduced into the water and suitably mixed therewith to absorb the coloring impurities, following which the absorbing material which has absorbed most, if not substantially all, of the discoloring material, is separated from the water by the above-described procedures.

The apparatus may consist of one or more containers for the water, supplied with a water inlet and a water outlet sufficient to maintain a body of water within the container. One or more gas inlet conduits open into the container between the liquid inlet and outlet. The container also has a foam outlet at its top, this outlet being connected to a pump. This pump will preferably be such as to break up the foam which passes through it. Several embodiments of systems including a number of such containers are provided by the invention.

The invention will be better understood by reference to the accompanying drawings, in which:

FIG. 2 is a view similar to FIG. 1, but illustrating a different embodiment of apparatus employing the principles of the invention and certain units of the system illustrated in the figure being shown in vertical sectional view to disclose details thereof.

FIG. 3 is a top plan view of the suction conduit means employed in the apparatus shown in FIG. 2, as seen on the line 3—3 of FIG. 2.

FIG. 4 is a fragmentary vertical sectional view, partly broken away to foreshorten the same, of one of the extractor units shown in the system illustrated in FIG. 2, as seen on the line 4—4 of FIG. 2.

FIG. 5 is an enlarged plan view of an additional gas discharging means employed in the system shown in FIG. 2, the same being partially illustrated diagrammatically to illustrate the arrangement of discharge ports therein and being illustrated as seen on the line 5—5 of FIG. 2.

FIG. 6 is a fragmentary vertical sectional view showing a detail of one embodiment of gas discharge means, as particularly employed in the system shown in FIG. 2.

FIG. 7 is a view similar to FIG. 2, but showing units of the apparatus arranged in series rather than in parallel.

Figure 1:
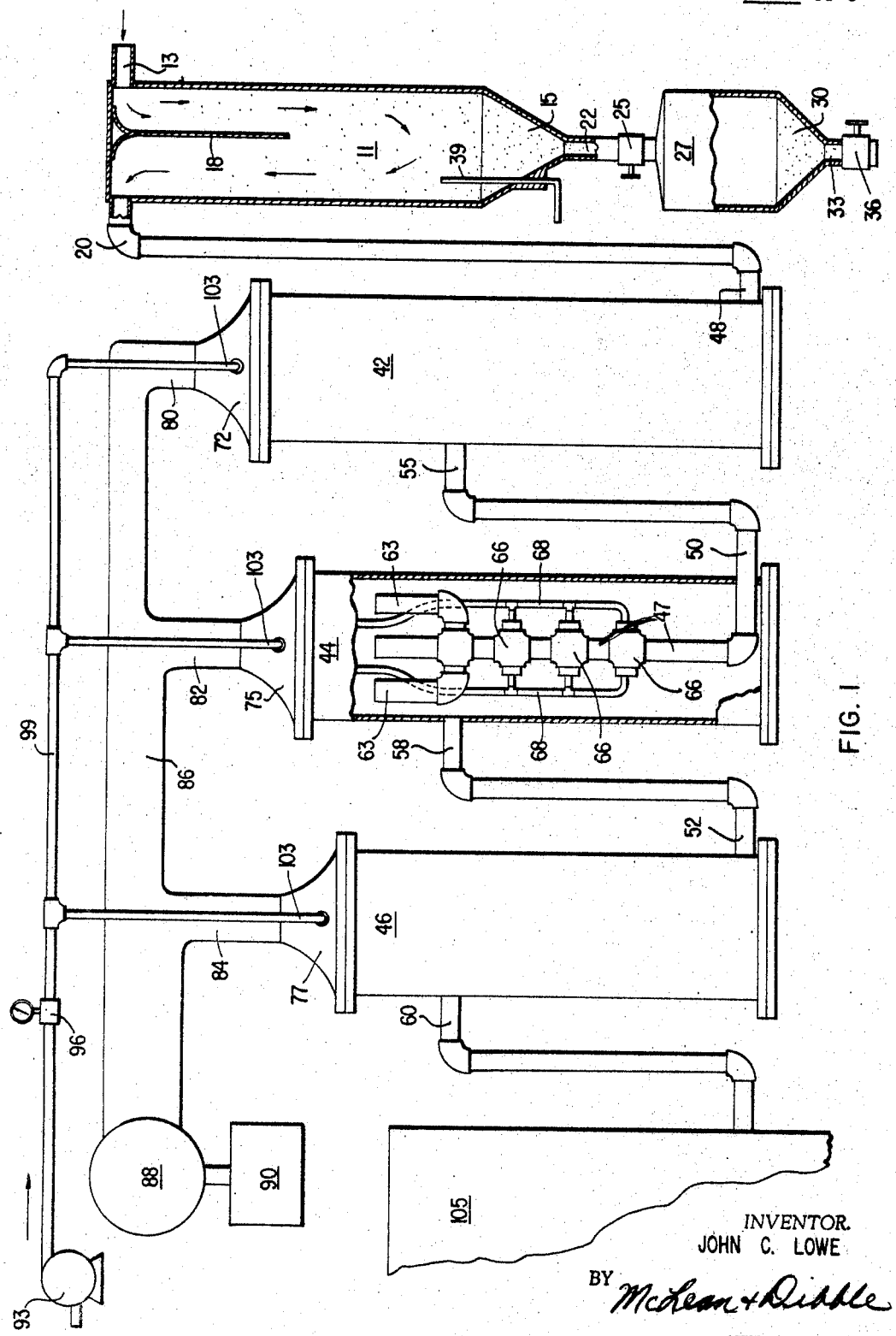
FIG. 1 is a representation, in schematic form, of one type of apparatus embodying the principles of the present invention, part of the same being illustrated in vertical section to show details thereof.

In FIG. 1 of the drawings, an apparatus is shown which has a preliminary dirt removal stage, three stages of detergent removal and a final filtration stage for the waste water.

Waste water from the laundry or other detergent-using operation enters dirt remover 11 from the inlet 13. Said remover acts upon solid type impurities responsive to gravity. A pump (not shown) may be provide to insure flow. This dirt remover may be a conventional gravitational separator, but preferably is the novel device shown, which may be an elongated vessel of any desired cross-sectional shape, preferably cylindrical, with the tapered bottom 15. The vessel 11 is provided at its upper portion with the partition 18 which descends more or less vertically from the closed top of the vessel about halfway toward the bottom. As shown, the waste water inlet is at one side of the top of the settler and the other side of the top is provided with the outlet conduit 20. Preferably, the generally vertical partition 18 is placed closer to the inlet 13 than to the outlet 20 in order to reduce the upflow velocity, thereby minimizing the tendency of the flowing liquid to carry dirt and sediment, which gathers in the tapered bottom 15, out of the vessel through the conduit 20.

The tapered bottom 15 is provided with the dirt removal conduit 22 which is provided with the valve 25. This conduit 22 leads to the collection chamber 27 which, again, is a vessel provided with a tapered bottom 30. A discharge conduit 33 is attached to the tapered bottom and this conduit is provided with the valve 36. It can be seen that the dirt removal apparatus provides for settling of the solids carried by the waste water into the truncated portion 15. When discharge of the dirt is required, the valve 36 is closed and valve 25 is opened. This allows the dirt to pass into the collection tank 27 without the constant supervision of an attendant or a great disturbance of the normal water flow through chamber 11. The dirt recollects in tank 27 and when this tank is full, gravitational separation continues in the upper chamber and, indeed, the valve 25 may be left open to allow the dirt in the truncated portion 15 to continuously descend, displacing water back into the waste stream from the tank 27. When tank 27 is full, valve 25 is closed and valve 36 may be opened for discharge of the dirt and other solids.

The gravitational chamber 11 may conveniently be provided with the air or water entry conduit 39 which is placed in the chamber 11 in such a manner that it opens into the wide, upflow, side of the tank, under the outlet conduit 20. The entry conduit 39 is used to control the amount of fibrous material in the chamber 11. Such material has a tendency to accumulate as a layer above the heavier dirt layer in the bottom 15 and has a filtering action which prevents proper settling of the dirt. Entry of air or water into the tank 11 above the dirt layer serves to put the fibrous material back into the main waste water stream and remove it through the conduit 20. Thus this dirt settling device provides for more efficient removal of heavy solids from the waste stream.

The several foaming or extractor vessels illustrated are referred to as 42, 44 and 46. In the drawing, foaming vessel 44 is cut away to show the preferred aeration pipe 47 and its relationship to the rest of the apparatus. Each of the vessels 42, 44 and 46 is provided at or near its bottom with a waste liquid entry conduit, 48, 50 and 52 respectively, which leads preferably to the internal aeration pipe; for example, liquid entry conduit 50 is connected to the pipe 47. Each vessel is also provided, preferably somewhat below its top, with a waste liquid outlet conduit 55, 58 and 60 respectively. These outlets may be arranged at succeedingly lower levels to assure movement of the waste liquid by gravity.

The pipe 47, as can be seen, has a restricted cross-section and is provided at its top with, preferably, a plurality of orifices 63 which are open to the interior of the foaming vessels. The pipe is also provided at a plurality of points 66, along its length and around its circumference, with the gas lines 68. A sufficient number of lines 68 are provided so that, at a relatively low pressure of air, enough air will be provided to make bubbles of substantially all the detergent present in the waste water. It can be seen that the portion of the vessel 44 which surrounds the pipe 47 constitutes a quiescent zone for water exiting from orifices 63, in which quiescent zone the water still may be subjected to a vacuum from above.

Where the pipe 47 and orifices 62 are not employed, gas lines 68 and liquid inlet 50 will open directly into the vessels 42, 44 and 46, preferably at a plurality of points.

At the top of each vessel 42, 44 and 46 and above the level of the fluid outlets 55, 58 and 60 are vacuum chambers 72, 75 and 77. As illustrated, these chambers may be conical or pyramidal in form; they serve as gathering places for the foam bubbles. The top of each vacuum chamber leads to a gas outlet conduit, 80, 82 and 84, respectively. These, in turn, lead to the exhaust header 86 which is connected in fluid-tight engagement with the gas pump 88. Preferably, this pump is of the blade or propeller type. This pump serves a dual purpose; it creates the gentle vacuum required to lift the foam bubbles out of the vacuum chamber without breaking the bubbles and also serves to break the bubbles when they reach the blades. The pump 88 is suitably provided with the reservoir or other means 90 for collection of liquid detergent concentrate which drips from the fan blades or which is recovered from the droplets remaining in the exit gas.

The apparatus is provided with means for supplying inert gas to gas lines 68. These means preferably comprise the air pump or compressor 93, which may lead by means of a regulator 96 to the gas inlet header 99. The inert gas travels to each vessel by lines 103 which enter the vessels and are connected to the branch line arrangements 68.

The final liquid effluent conduit 60 leads to tank 105 where the waste water may be held for subsequent conventional sewage treatment, filtration for recirculation to the laundry, etc. Lint and other light fibrous material in the waste water becomes entrained in the detergent bubbles in the vessels 42, 44 and 46 and passes to the reservoir 90, whence it may be skimmed or filtered from the detergent concentrate.

Examples

A series of runs were performed to show the effectiveness of the process of this invention in treating detergent-containing water. In each series, the "waste water," starting or feed material to be treated was sent through an apparatus substantially as shown in the drawing at the rate of about 14 gallons per minute, the waste water flowing through the gravitational separator and being aerated while flowing through the internal pipes. Air at about 1.75 p.s.i.g. was introduced into the upflowing liquid in the pipe at about 8 cu. ft./min. Foaming liquid came out the top of each pipe and in the quiescent zone within the separating chamber foam floated on top of the water, filling the upper portion of the foam chamber, the conical tops and the header 86. The slight vacuum was created by a ¼ HP motor operating a 10″ diameter fan having 8 blades and rotating at about 34–50 r.p.m. About 5 quarts of broken foam extract product were produced for every 420 gallons of feed.

In the first series, the detergent employed was a commercially obtained liquid (Wisk) which was analyzed and found to contain 52.3% solids, the organic matter in the solids comprising 22.6% of the total detergent sample. The detergent was known to be a mixture of phosphates and alkyl benzene sulfonates.

Raw water containing 354 p.p.m. solids, of which 130 p.p.m. was organic material, was mixed with the above detergent to provide a synthetic "waste" water containing 840 p.p.m. solids of which 300 p.p.m. was organic solids. The "extract" detergent concentrate collected in reservoir 90 was tested and found to contain 1053 p.p.m. total solids of which 390 p.p.m. were organic. The effluent, residual or product water collected in filter chamber 105 tested as 290 p.p.m. solids, of which 78 p.p.m. were organic.

In another run, a sample of the starting "waste" solution was analyzed in comparison with the "product" water solution from filter chamber 105. These analyses used the methylene green colorimetric method and a Hach DR Colorimeter. The starting solution was diluted 300:1 and read 0.26 p.p.m. alkyl benzene sulfonate. This is equal to 78 p.p.m. of ABS. The finished product was diluted 50:1 and read 0.1 p.p.m. ABS. This is equal to 5.0 p.p.m. of alkyl benzene sulfonate. Thus, 93.5% of the alkyl benzene sulfonate was removed from the detergent-containing waste water, bringing the ABS content down to a tolerable level in just one pass through the processing.

In another run, the starting detergent waste was prepared by adding 22 ounces of Wisk to 45 gallons of water. The ABS content is calculated to be about 480 p.p.m. After passage through the apparatus, the finished product showed only 8.2 p.p.m. ABS. The detergent removal rate therefore was about 98.5%.

Starting, extract and finished samples were taken from a still further run and were sent to the analytical laboratory of a detergent manufacturer for analysis. The values reported do not take cognizance of the effect of certain hydrotropes, but can be considered accurate relative to each other.

The sample marked "Start" had 120 p.p.m. detergent calculated as ABS, the sample marked "Extract" had 84 p.p.m. detergent calculated as ABS, while the sample marked "Finish" had only 4.1 p.p.m. detergent calculated as ABS, a detergent removal of about 96.5%.

The foregoing description has been concerned primarily with the removal of detergents and similar types of organic impurities and waste material found in commercial and industrial water following use thereof relative to performing various commercial and industrial procedures. Use of the principles of the present invention, however, is not restricted to procedures for removing detergent-like and similar impurities and contaminants from used commercial or industrial water to recondition the same either for reuse or for discharge into public streams. Certain types of water used for commercial and industrial purposes contain discoloring impurities. One outstanding example of such type of water is that which results from industrial dyeing establishments which notoriously discolor the waste water following dyeing operations. Also, vast quantities of water are used in dyeing establishments, thereby presenting a very aggravating problem, especially to clarify the water either to condition it for reuse or discharge into public streams.

Particularly for purposes of clarifying used industrial water which has been discolored through such use, such as by removing the dissolved coloring compounds which are in solution in the water, it has been found that suitable color-absorbing materials may be introduced into commercially or industrially used water for purposes of absorbing the coloring compounds or impurities therefrom, at least to a level where the water may either be reused or discharged satisfactorily into public streams or other waterways. One appropriate and highly useful absorbing material for such purposes is unslaked lime, which is calcium oxide. This is introduced in particulate form and is thoroughly mixed throughout the so-called feed water which is to be clarified so as to recondition it for reuse or safe discharge into streams.

After the aforementioned lime is introduced into the feed water and is permitted to remain therein for certain periods of time sufficient, while either foaming or quiescent, to remove at least a substantial percentage of the discoloring impurities, the solution comprising the feed water and lime is introduced to the apparatus systems illustrated principally either in FIG. 1 or FIG. 2. When being subjected to the systems, the color-absorbing material is of such size and nature that at least no appreciable amount thereof is discharged from the system in the dirt remover unit thereof. Such absorbing material, however, is highly adaptable to being gasified or aerated by the injection of gas, such as air, into a confined stream of the feed water when the same is introduced into one of the extractor units of either of the systems illustrated in FIGS. 1 and 2.

It will be appreciated that passage of the feed water successively to a series of such extractor units is capable, under most conditions of use and in regard to most types of waste commercial or industrial water, will result in the end product being reasonably clear and suited either for reuse or acceptable discharge into public streams. This is generally true, unless there are objectionable chemical compounds in the feed water which otherwise require suitable chemical treatment either to remove or neutralize such objectionable contents.

Referring to the system illustrated in FIG. 2, the basic principles of the system shown in FIG. 1 are very largely utilized, at least in general principles, but certain further refinements have been devised since the system of FIG. 1 originally was developed and that is the principal reason for filing the present application as a continuation-in-part of the original application in which the system of FIG. 1 comprised the sole illustration, while permitting said original application to become abandoned.

In FIG. 2, the feed water to be treated, and especially to be clarified so as to remove any color contaminants therefrom, enters the system through inlet pipe 106 by which it is introduced into dirt remover unit 108 which may be quite inexpensively constructed through the employment of a casing 110 comprising a suitable length of industrial pipe of appropriate diameter. The opposite ends are threaded to permit the attachment of top and bottom caps 112 and 114. A solids discharge conduit 116, having a flow control valve 118 therein, communicates with the bottom cap 114.

The top cap has a pair of ports therein, one of which accommodates a flow-confining tube 120 which preferably comprises a piece of industrial pipe of suitable length and of substantially less diameter than casing 110. The length of tube 120 preferably is substantially less than half that of casing 110, the latter preferably being disposed in vertical position in use. Feed water entering pipe 106 is discharged from the open lower end of tube 120 into casing 110, either by gravity flow or as induced by a pump. The downwardly directed incoming stream serves to carry any contaminating solids entrained therein toward the bottom of casing 110 where gravity tends to cause the solid material to remain.

Feed water from which any solid contaminating material has been removed flows from the upper end of casing 110, through exit port 122, into feed conduit 124 which extends downwardly and is connected to a horizontal conduit 126 that extends between the exterior of an exemplary series of three extractor units 128, 130 and 132 which, in FIG. 2, are shown as being connected in parallel to each other. Said units preferably are similar in construction and each comprises a vertically disposed cylindrical container or vessel disposed in close proximity to the others, as readily can be seen from FIG. 2.

Provided in each of the containers of said units, a predetermined distance above the bottom thereof, is a substantially horizontal inlet conduit 134, which respectively comprise branch connectors between feed conduit 126 and the lower ends of vertical pipe assemblies 136, one of which is provided in each of the containers 128, 130 and 132.

The vertical pipe assemblies 136 have two main functions. One of these is to provide an inlet for the feed water to the interior of said containers. The second one is to provide means by which gas, such as air, is injected in suitable streams, at pressures in excess of atmospheric, into a column of feed water moving upward through the pipe assembly 136 for discharge from the upper end 138 thereof. The pipe assemblies 136 each preferably comprise a series of short lengths of pipe extending between tubular connectors 140. A suitable elbow 142 connects the lowermost section of pipe with the inlet conduit 134, as is clearly shown in FIG. 4. It also will be understood that FIG. 4 is a vertical section taken at 90° to the vertical section of extractor unit 128 shown in FIG. 2.

Streams of gas are injected at longitudinally spaced locations along each vertical pipe assembly 136, and preferably at diametrically opposed locations, by means of a pair of branch gas conduits 144 which are both connected at the upper ends thereof to a gas delivery pipe 146 by means of a T 148. Each of the branch conduits 144 also include a plurality of T's 150 spaced longitudinally similarly to the spacing of the tubular connectors 140 and opposite the same at diametrically opposed locations. Threaded nipples 152 extend between the stems of the T's 150, as well as between one end of the lower elbows 154, and tapped holes formed in opposite walls of the connectors 140 and elbows 142.

As seen best in FIG. 6, the inner end of each nipple 152 communicates with the interior of connectors 140 and elbows 142 and such inner ends are interiorly threaded to accommodate a suitable nozzle-forming means such as a threaded plug 156 substantially of conventional type. Said plug has a geometrically shaped end 158 engageable by a wrench so as to tighten the plug 156 within the nipples 152. The projecting end of each plug 158 is drilled to provide a nozzle opening 160 by which gas such as air is injected into each of the connectors 140 and the elbows 142. As gas is supplied under pressure to longitudinally extending supply conduit 162, it passes through lateral connectors 164, see FIG. 4, and gas delivery pipes 146 to the branch conduits 144, and from there to the nozzle openings 160. It thus will be seen that air, at least under moderate pressure, as supplied by air compressor or air pump 166 to conduit 162, will be injected in appreciable quantities into the feed water rising through the vertical pipe assembly 136 of each of the extractor units and in sufficient quantities to substantially saturate the water with air bubbles.

Due to the confining or constricting effect of the vertical pipe assemblies 136 upon the feed water and entrained air rising therethrough, when the water discharges freely from the preferably unrestricted open upper end 138 of said pipe assemblies 136, the multitude of air bubbles entrained in said rising column of feed water immediately expand upon the water discharging from said upper end 138. This causes immediate creation of foam and froth on the surface of the pool of water which forms in each of the extractor units during operation thereof. Normally, the upper lever of the pool thus formed in each extractor unit will be located in the upper portion of each unit, sometimes being even slightly above the discharge end 138 of the vertical pipe assembly 136 in each unit.

The particulate absorbing material, referred to above, which has been thoroughly intermixed with the feed water to absorb discoloring material therein is of a sufficiently small size that, under normal circumstances, it will be entrained within the foam formed upon the upper surface of the pool of feed water occurring in each of the extractor units. As in regard to the embodiment shown in FIG. 1, the additional embodiment shown in FIG. 2 includes preferably conical caps 168 securely fixed to the upper ends of each of the container bodies of the extractor units. A take-off connector, such as elbow 170, is connected to the upper end of each of the caps 168 and also is connected for discharge to an elongated header or conduit 172 which, as is seen from FIG. 3, comprises a plurality of sections progressively larger in diameter toward the delivery end which are interconnected by reducing T's 174.

The discharge end 176 is connected to an evacuator blower or pump 178 which preferably has a bladed impeller therein and creates a negative pressure within the conduit 172 for purposes of withdrawing from the upper end of each of the extractor units the foam which progressively is formed therein. The conical shape of caps 168 minimizes pressure of the uppermost portion of the foam upon the lowermost portion. Such removal preferably is of a gentle nature, as described above with respect to the operation of the apparatus shown in FIG. 1 so as to maintain the foam substantially in its initial form until it reaches the impeller means of the evacuator blower 178. Upon the impellers contacting the bubbles forming the foam, they are collapsed, thereby reducing the contents of the bubbles to liquid condition.

The absorbing material which has absorbed very substantial quantities of the discoloring contaminants of the feed water will be largely concentrated in such liquid. However, under certain relatively normal conditions of operation of the clarifying apparatus, even though the absorbing material has absorbed appreciable quantities of the discoloring material which was in the feed water, the contacting of the bubbles by the blades of the impeller of evacuator blower 178 will operate further to disintegrate the particles of absorbing material and thereby expose additional surfaces and faces thereon capable of further absorption of discoloring material. Under such circumstances, the condensed liquid which is discharged from the evacuator blower 178 is capable of being introduced into additional feed water to be clarified and reused one or more additional times following the initial use thereof, until the sizes of the particles are so small that further use is inefficient and impractical. The condensed absorbed material, in liquid condition, is collected suitably, such as within a container 180 and discharged therefrom, as controlled by any suitable means, such as the valve 182 shown in FIG. 2.

Further to facilitate the gasifying or aeration of the pool of feed water within each of the extractor units 128, 130 and 132, the embodiment of the invention illustrated in FIG. 2 also contemplates the use of additional or auxiliary means to introduce further quantities of air into said units, preferably in the lower portions thereof, and thus augment the action of nozzles 160 described above.

In the preferred embodiment of the invention, such introduction is at a level even below that of the exit port 184 in the lower portion of each of said units as illustrated in FIGS. 2 and 4. Further in accordance with the preferred construction of the invention, the exit ports 184 are at the same side of the containers of each of the units as the inlet conduits 132 so as to afford minimum piping requirements between the units in the parallel arrangement thereof seen from FIG. 4.

Such additional or auxiliary introduction of air into the lower portion of each of the extractor units is afforded preferably by means of a spiral helix 186 of suitable tubing or pipe, either metallic, plastics or otherwise, a plan view illustration thereof being best shown in FIG. 5 on a larger scale than that employed in FIGS. 2 and 4 wherein the helix also is shown. By way of example, the diameter of the tubing or pipe from which the helix is formed may be similar to that of the branch gas conduits 144. The outer end of the helix or air discharge head 186 is connected to a gas feed pipe 188 and the opposite end is closed, such as by a cap 190.

At preferably regularly spaced intervals along the helix 186 are gas discharge ports 192, several of which are shown in preferred proportion relative to the helix 186 in FIG. 5. Preferably, said spaced discharge ports 192 are formed in the helix substantially for its entire length. As a result, it will be seen that a series of jets of gas, such as air, will rise from the ports 192 in closely dispersed relationship to each other across the entire bottom area of the extractor units. Such rising columns of gas greatly facilitate the formation of gas bubbles rising steadily throughout the entire volume of feed water contained in the pool within the extractor unit. As a result, when the bubbles reach the upper surface of the pool, they will additionally form foam and thereby further facilitate the removal of the color-absorbing material from the feed water to clarify it.

The upper ends of the gas feed pipes 188 are connected to suitable inlet means 194 extending through the wall of the upper portion of the containers of the extractor units as clearly shown in FIG. 4, said inlet means being connected by additional gas delivery pipes 196 to the gas supply conduit 162, for example.

To facilitate the operation of the extractor units 128, 130 and 132, the caps 168 thereof preferably are provided with suitable sight gauges 198, especially for purposes of observing foam levels and conditions occurring within said cap. Also, the bottom of the containers of each of the extractor units preferably are provided with drain exit means 200 controlled by suitable valves 202. Also, the exit ports 184 through which the partially or completely clarified feed water is withdrawn from the lower portions of each of the extractor units are connected to a horizontally extending collector conduit 204, best shown in FIG. 2, the discharge end of which is connected to an appropriate pump 206 for purposes of delivering the treated water to a suitable storage tank or reservoir symbolically illustrated as tank 208 in FIG. 2.

The exemplary system embodying multiple extractor units 128, 130 and 132 connected in parallel arrangement is illustrated for use to treat three different portions of a given supply of feed water simultaneously. However, it can be appreciated that simply by connecting the exit port 184 of unit 128, for example, with inlet conduit 134 of the next succeeding unit 130, and then by connecting the exit port 184 of unit 130 with inlet conduit 134 of the last-illustrated unit 132, followed by exit port 184 of unit 132 being connected to pump 206, for example, the multiplicity of units may be used in series in the system. Such an arrangement is illustrated, somewhat schematically, in FIG. 7. It also is to be understood that such exemplary systems as described herein may employ any number of extractor units desired, connected either in parallel or in series with each other, as purification and clarification of any given supply of feed water demands. Under all such circumstances, however, it is preferred that the foam, as formed in the upper portions of each of the units, be withdrawn individually from said units by suction induced upon the vacuum header or conduit 172.

Further, while the system illustrated particularly in FIG. 2 has been described as being especially useful for removing discoloring impurities and waste material from feed water which is to be clarified such as by having said discoloring impurities removed therefrom by said system, it is to be understood that the system may be employed to remove undesirable impurities from any type of feed water as long as such impurities are capable of being converted to foam through the injection of gas, such as air, into the feed water by the method described hereinabove comprising the present invention. Incident to such removal by such foaming procedure, it is to be understood that certain absorbing or other type of reacting agents may be introduced into the feed water, in accordance with the principles of the invention, and then subjected to injection of gas by the above-described method to form a foam and thereby effect removal of preferably at least a major portion of the impurities from the feed water, either by a single passage thereof through the system or multiple passages thereof, depending upon whether the system is arranged with the multiplicity of extractor units disposed in parallel or in series with each other.

While the invention has been described and illustrated in its several preferred embodiments, it is to be understood that the invention is not to be limited to the precise details herein illustrated and described since the same may be carried out in other ways falling within the scope of the invention as claimed.

I claim:

1. A method of clarifying waste waters having impurities therein capable of being converted into foam comprising the steps of passing feed water to be clarified along a confined path directed upwardly, injecting said feed water with a plurality of streams of gas at longitudinally spaced locations and at a pressure sufficient to progressively substantially saturate said water with gaseous bubbles, discharging said substantially saturated stream of water from said confined path and thereby freeing the air bubbles in said stream to expand and thereby produce a foam containing said impurities, permitting said foam to rise above the level of said discharged water, applying a negative pressure above said foam to effect separation thereof from said water, reducing said foam to fluid condition when separated from said water, and removing said water as a product having a substantially reduced content of said impurities.

2. The method according to claim 1 in which said gas is injected into said confined path at transversely opposed locations to effect efficient formation of gas bubbles in said feed water prior to discharging said water from said confined path.

3. The method according to claim 1 including the further preliminary step of subjecting said feed water to be clarified to the removal of solid impurities therefrom comprising feeding a stream of said feed water downwardly under pressure along a confined path into a vertical column of said water having a transverse dimension substantially less than the depth thereof, said confined path of said stream extending into said column less than half the depth thereof, permitting solid impurities to fall by gravity to the bottom of said pool for removal therefrom, and withdrawing from the upper part of said column the water from which said solid impurities have been removed for delivery to said confined path for injection of gas thereinto.

4. The method according to claim 1 including the additional preliminary step of introducing into said feed water material capable of absorbing discoloring impurities present in said water, said absorbing material being capable of being converted to foam by said injected gas when said stream of water is discharged from said confined path.

5. The method according to claim 4 including the further subsequent step of reintroducing said foam in fluid condition into said feed water prior to injecting said gas thereinto.

6. The method according to claim 5 in which said absorbing material is of particulate character capable of being broken into smaller particle sizes and said method including the further step of causing said particulate type absorbing material to be broken into smaller sizes when reducing said foam to fluid condition and thereby forming additional exterior absorbing surfaces capable of further absorption of discoloring impurities when said fluid foam material is reintroduced into said feed water.

7. The method according to claim 1 in which said discharge of said bubble-containing feed water occurs into an area substantially greater transversely than the cross-sectional area of said upwardly directed confined path of said water, thereby to facilitate said production of foam.

8. The method according to claim 7 including the additional steps of discharging said bubble-containing feed water into a pool extending downwardly from where said discharge occurs, withdrawing said product water from the lower part of said pool, and discharging additional gas into the lower part of said pool to enhance the formation of foam at the top of said pool.

9. A method for handling fiber in a system for removing foam from water containing foamable impurities, heavy solids and fiber which comprises passing said water to a gravitational separation zone wherein heavy solids settle to the bottom of said zone, injecting a fluid into said zone above said settled solids to disperse said fiber in the supernatant water, passing said water to contact with a stream of inert gas sufficient to foam said impurities out of the water while applying a negative pressure above a body of said water, removing foam containing said fiber from the top of said water, and comminuting said foam to produce a concentrate of said impurities and fiber in water.

10. A method for treating waste water containing solids, detergent and fiber which comprises continuously introducing said water into a gravitational separation zone whereby heavy solids form a lower layer and detergent-containing water forms an upper layer and fiber tends to form an intermediate layer which prevents further separation, injecting an upwardly directed fluid stream into said separation zone above said lower layer to disperse said intermediate layer into said upper layer, passing said upper layer of water containing detergent through an upflow zone of restricted cross section, injecting inert gas into said upflowing water in said upflow zone, passing said water from the upflow zone to a quiescent zone and holding said water therein, and, during said passing and holding, applying a negative pressure above said upflow and quiescent zones, whereby a foam layer containing said fiber forms at the top of said zones, removing said foam containing said fiber due to the influence of said negative pressure, and comminuting said foam to produce a concentrate of said fiber in water.

11. An apparatus for treating water to remove impurities therefrom which comprises a vertically elongated vessel having an upper inlet and an upper outlet separated by partition means descending from the top of the vessel to define a downflow portion and an upflow portion, said vessel being provided with a bottom having waste discharge means therein, said outlet being connected to the liquid inlet of a container having a second liquid outlet positioned therein suitably for maintaining a body of liquid in said container, said container having a gas inlet and outlet and operable to produce foam containing undesired impurities, and a foam outlet at the top of the container connected to an air pump to withdraw said foam from said body of liquid and thereby reduce the impurity content thereof.

12. The apparatus for treating water according to claim 11 further including a plurality of said containers, means connecting the liquid outlet of preceding containers with the liquid inlet of succeeding containers to permit successive treatments of said water in said containers, and duct means connected to the top of each container and to suction means to effect removal of foam from said containers.

13. The apparatus according to claim 12 further including a gas pump having a bladed impeller therein comprising said suction means and the blades thereof being operable to collapse the bubbles comprising said foam, thereby to reduce said foam to liquid.

14. The apparatus according to claim 12 in which said gas inlet conduit comprises an upright pipe extending internally upward in each of said containers and the liquid outlet of a preceding container being connected to the inlet of the upright pipe of each succeeding container and the upper end of each pipe discharging water into said container.

15. The apparatus according to claim 14 in which said upper discharge end of each pipe is adjacent but spaced below the upper end of each container.

16. An apparatus for treating water which comprises a vertically elongated container, an upright internal pipe therein of restricted cross-section, liquid inlet means for said container connected to the lower part of said pipe to deliver thereto water to be treated, discharge opening means in said pipe discharging into the upper portion of said container, a liquid outlet from said container below the level of said discharge opening means in said pipe, said pipe having a plurality of gas inlet orifices therein at longitudinally spaced locations therealong, conduit means connected between a source of gas under pressure and said orifices and operable to inject streams of gas under pressure at longitudinally spaced locations into a stream of water when moving upwardly therein to introduce a substantial quantity of gas bubbles into said water sufficiently to cause substantial foaming of water as it exits from the discharge openings means in said pipe, a duct connected to the upper portion of said container above said discharge opening means, and suction-inducing means connected to said duct and operable to withdraw from the upper portion of water within said container above the level of said discharge means of said pipe foam entrained with impurities removed from said water by the air streams injected thereinto.

17. The appparatus according to claim 16 in which at least certain of said gas inlet orifices are transversely in opposition to each other to direct streams of air toward each other, thereby to facilitate injection of air into said water stream to insure the formation of bubbles therein to entrain therein impurities from said water stream.

18. The apparatus according to claim 16 in which said discharge opening means in said pipe comprise a plurality of interconnected branch pipes, thereby facilitating expansion of gas bubbles within said water as discharging through said discharge opening means to facilitate the generation of foam in the upper portion of said container.

19. The apparatus according to claim 16 further including additional gas discharge means positioned in the lower part of said container and having gas inlet means and spaced discharge ports therein, and means connecting said inlet means to a source of gas under pressure, said additional gas discharge means augmenting the foaming effect produced by the gas injected into said upright internal pipe.

20. The apparatus according to claim 19 in which said additional gas discharge means comprises a spiral coil of pipe having discharge ports therein in spaced relationship to each other along said spiral.

21. The apparatus according to claim 20 in which said spiral coil is substantially flat and is positioned within said container at a level below that of the liquid outlet for said container.

22. The apparatus according to claim 16 in which a plurality of said containers are connected in series to form a water treating system, and conduits connected between the liquid outlets of preceding containers and the liquid inlet means of succeeding containers, the outlet means of each of said containers being below the level of the inlet means of each of said containers.

23. The apparatus according to claim 22 in which said water treating system also includes a duct extending between the upper portions of all said containers and said suction-inducing means, thereby simultaneously to withdraw foam from all said containers.

24. The apparatus according to claim 22 further including additional gas discharge means in the lower part of each container connectable to a source of gas under pressure and operable to augment the foaming effect produced by the gas injected into said upright internal pipe.

25. The apparatus according to claim 24 further including a gas supply conduit extending between said plurality of containers, and branch conduits extending from said supply conduit to each of said gas conduit means and additional gas discharge means in each of said containers, said additional gas discharge means in each container comprising a spiral coil adjacent the bottom of each container and having a series of spaced gas discharge ports therein.

References Cited
UNITED STATES PATENTS

| | | | |
|---|---|---|---|
| 278,178 | 5/1883 | Pichler et al. | 210—202 |
| 1,204,534 | 11/1916 | Andrews. | |
| 1,847,864 | 3/1932 | Cross | 210—535 X |
| 2,207,218 | 7/1940 | Forman | 209—158 |
| 2,777,815 | 1/1957 | Forrest | 210—3 |
| 3,169,841 | 2/1965 | Weis | 55—178 X |
| 3,192,155 | 6/1965 | Bready et al. | 210—221 X |

MICHAEL E. ROGERS, *Primary Examiner.*

U.S. Cl. X.R.

210—84, 202, 221, 305, 532; 55—178; 209—158